US008094955B2

(12) United States Patent
Asai et al.

(10) Patent No.: US 8,094,955 B2
(45) Date of Patent: Jan. 10, 2012

(54) IMAGE REDUCING APPARATUS AND REDUCED IMAGE GENERATING METHOD

(75) Inventors: Arito Asai, Tokyo (JP); Lien Ta, Kawasaki (JP)

(73) Assignee: Fujifilm Corporation, Tokyo (JP)

( * ) Notice: Subject to any disclaimer, the term of this patent is extended or adjusted under 35 U.S.C. 154(b) by 613 days.

(21) Appl. No.: 12/343,199

(22) Filed: Dec. 23, 2008

(65) Prior Publication Data

US 2009/0161975 A1 Jun. 25, 2009

(30) Foreign Application Priority Data

Dec. 25, 2007 (JP) .................................. 2007-331997
Dec. 25, 2007 (JP) .................................. 2007-331998

(51) Int. Cl.
*G06K 9/46* (2006.01)
*G06K 9/00* (2006.01)

(52) U.S. Cl. .................................. 382/248; 375/240.24

(58) Field of Classification Search .................. 382/248; 375/240.24
See application file for complete search history.

(56) References Cited

U.S. PATENT DOCUMENTS

| 6,704,358 | B1 * | 3/2004 | Li et al. | 375/240.02 |
| 6,907,077 | B2 * | 6/2005 | Yamada | 375/240.21 |
| 7,031,386 | B2 * | 4/2006 | Yamamoto et al. | 375/240.12 |
| 2003/0035588 | A1 * | 2/2003 | Boon | 382/238 |
| 2003/0081843 | A1 * | 5/2003 | Lee | 382/233 |
| 2006/0039478 | A1 | 2/2006 | Nonaka | |
| 2009/0213926 | A1 * | 8/2009 | Shin et al. | 375/240.2 |

FOREIGN PATENT DOCUMENTS

JP 2006-060540 A 3/2006

* cited by examiner

*Primary Examiner* — Jason M Repko
*Assistant Examiner* — Patrick Edwards
(74) *Attorney, Agent, or Firm* — Birch, Stewart, Kolasch & Birch, LLP.

(57) ABSTRACT

In a case where a padded orthogonally transformed block obtained by orthogonally transforming a padded image block of 8×8 pixels to which padding data has been added has been recorded as compressed image data, the padded orthogonally transformed block is subjected to an inverse orthogonal transformation to thereby restore the padded image block. Padding data contained in the restored padded image block is replaced with a portion obtained by copying a portion of the original image, thereby generating a modified image block. In a case where the true width of an edge pixel corresponding to an edge among the pixels forming the image block is less than 0.5, the pixel is obtained by adjusting the level of a pixel adjacent to the edge pixel in such a manner that it will have a level conforming to the width and level of the edge pixel.

6 Claims, 14 Drawing Sheets

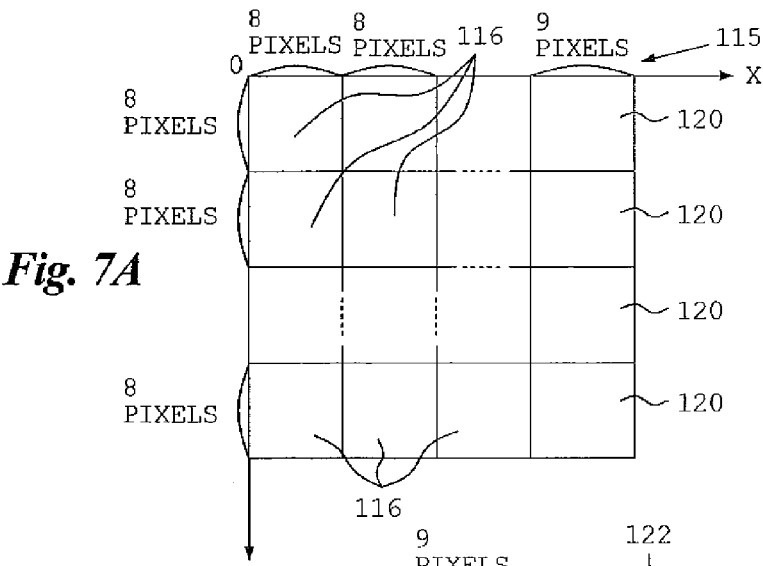
*Fig. 7A*
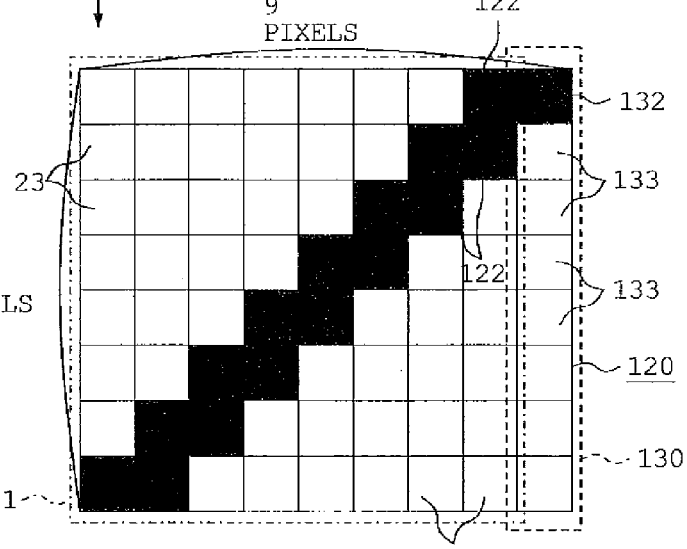
*Fig. 7B*
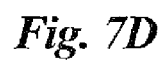
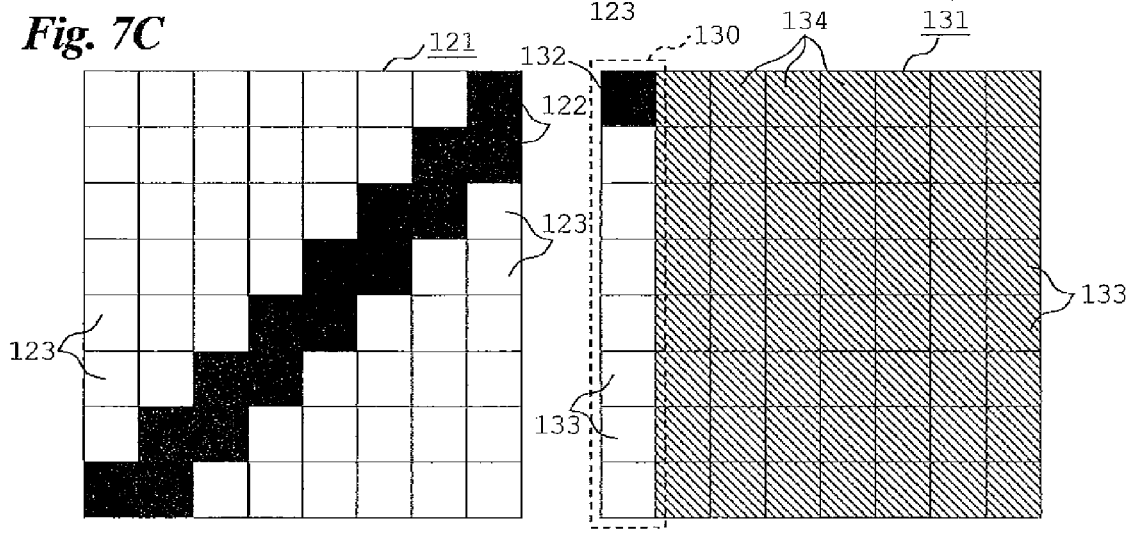
*Fig. 7C*
*Fig. 7D*

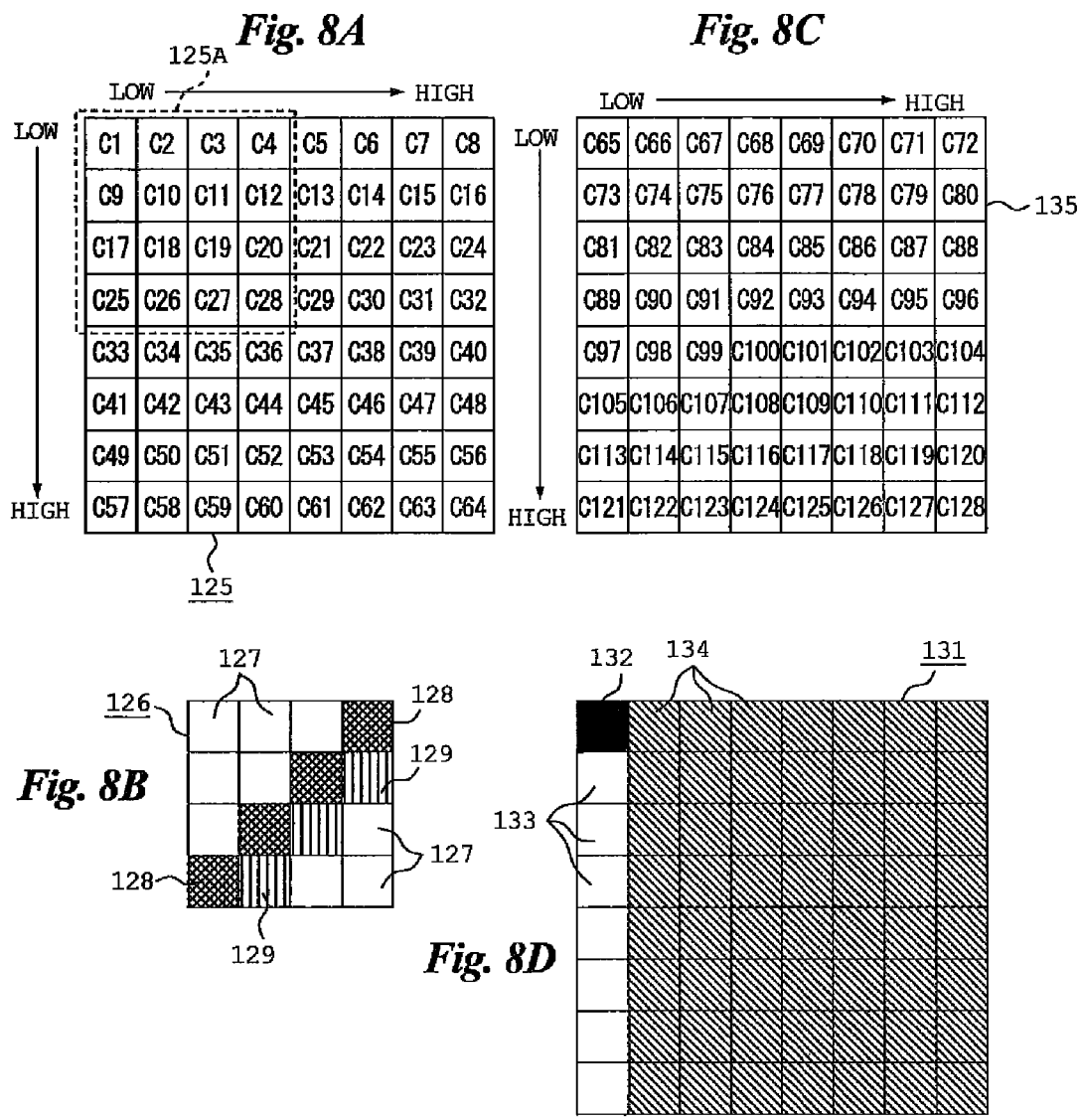

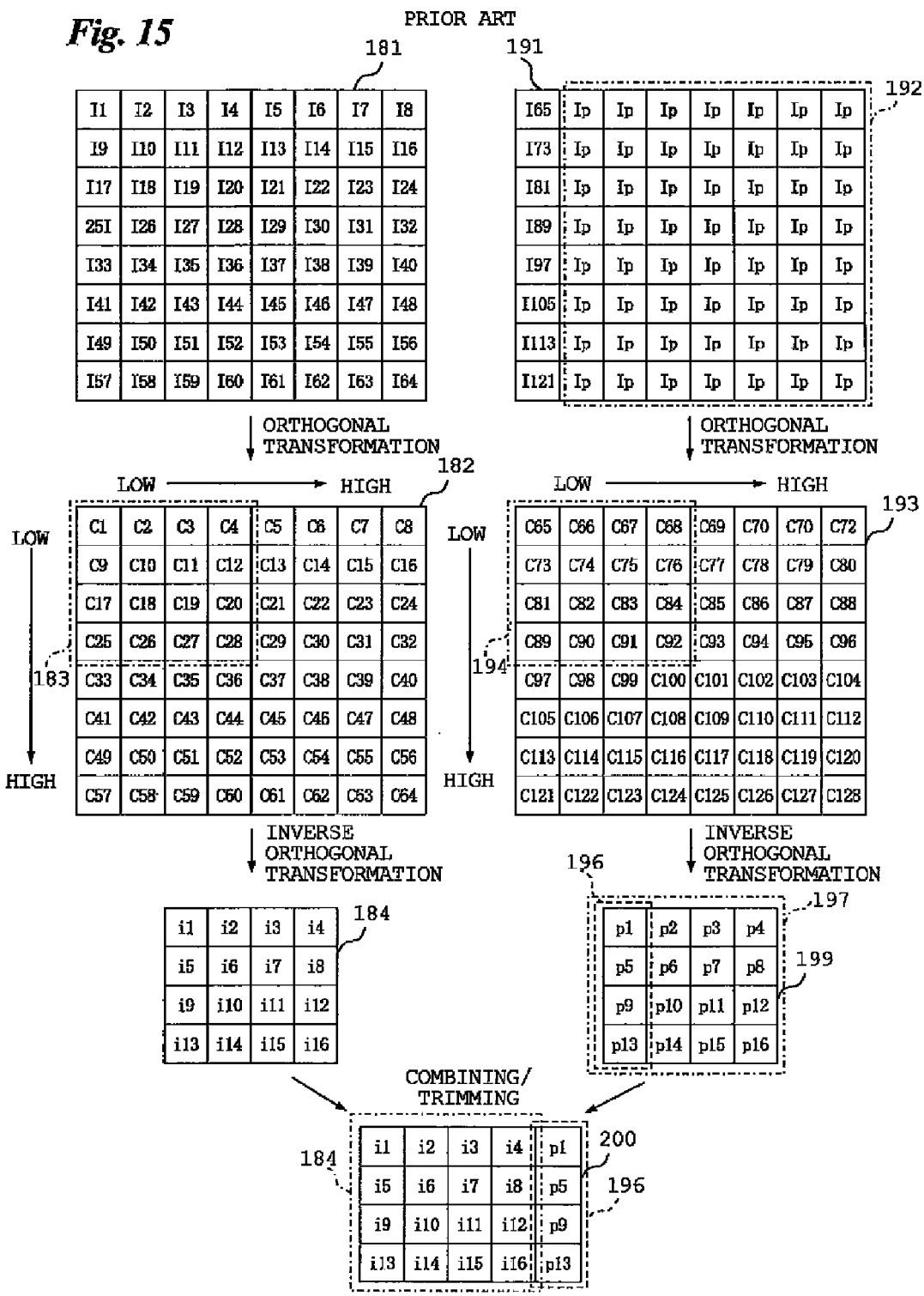

IMAGE REDUCING APPARATUS AND REDUCED IMAGE GENERATING METHOD

BACKGROUND OF THE INVENTION

1. Field of the Invention

This invention relates to an image reducing apparatus, a reduced image generating method and a computer program for controlling the image reducing apparatus.

2. Description of the Related Art

In an example of the prior art, image compression based upon the JPEG (Joint Photographic Experts Group) standard involves subjecting image data to orthogonal transformation processing. The orthogonal transform coefficients obtained by this orthogonal transformation are recorded on a recording medium. Orthogonal transform coefficients used in image reduction are decided in accordance with a reduction ratio and reduction processing is executed utilizing the orthogonal transform coefficients decided (see the specification of Japanese Patent Application Laid-Open No. 2006-60540). This reduction processing is carried out as indicated below.

With reference to FIG. 15, image compression based upon JPEG is performed in image block units of 8×8 pixels. One frame of an image is divided into a number of image blocks of 8×8 pixels. A number of complete image blocks 181 having 64 pixels I1 to I64 in an 8×8 pixel array are obtained. In a case where one frame of an image has been divided into a number of image blocks, an image block having 64 pixels in an array of 8×8 pixels will be referred to as a "complete image block". Further, depending upon the size of the original image, there are instances where an image block that does not possess 64 pixels in an array of 8×8 pixels is produced in a case where one frame of an image has been divided into a number of image blocks. An image block that does not possess 64 pixels in an array of 8×8 pixels will be referred to as a "deficient image block".

In the case of a deficient image block, data referred to as "padding data" is added on in such a manner that the deficient image block will become an image block having 64 pixels in an array of 8×8 pixels. An image block to which padding data has been added will be referred to as a "padded image block". In a padded image block 191 shown in FIG. 15, it is assumed that the column of eight pixels I65, I73, I81, I89, I97, I105, I113 and I121 contained in this block are represented by original image data and that a portion 192 containing the other pixels is represented by padding data Ip.

Although the complete image block 181 of 64 pixels in an array of 8×8 and the padded image block 191 of 64 pixels in an array of 8×8 to which the padding data Ip has been added are illustrated in FIG. 15, the pixels I1 to I64, I65, I73, I81, I89, I97, I105, I113 and I121 of the original image (one portion thereof) are represented by 72 pixels of image data in an array of 9 pixels horizontally and 8 pixels vertically.

By orthogonally transforming the complete image block 181, a complete orthogonally transformed block 182 composed of 64 orthogonal transform coefficients in an array of 8×8 orthogonal transform coefficients is obtained. The block obtained by orthogonally transforming the complete image block 181 will be referred to as a "complete orthogonally transformed block" 182. The complete orthogonally transformed block 182 contains 64 orthogonal transform coefficients C1 to C64. In a case where compression based upon JPEG is carried out, an orthogonally transformed block obtained by orthogonally transforming an image block is recorded on a recording medium. The orthogonal transform coefficients represent frequency components. The closer a coefficient is to the upper left, the lower the frequency component; the closer the coefficient is to the lower right, the higher the frequency component.

Among the orthogonal transform coefficients C1 to C64 that form the complete orthogonally transformed block 182, those conforming to the reduction ratio are decided in order starting from the low frequency components. For example, if a reduced image has a size that is one-half that of the original image, then orthogonal transform coefficients C1 to C4, C9 to C12, C17 to C20 and C25 to C28 included in a 4×4 block 183 at the upper left of the 8×8 complete orthogonally transformed block 182 are decided upon as the orthogonal transform coefficients to be used. By subjecting these decided orthogonal transform coefficients to an inverse orthogonal transformation, a first reduced image block 184 of 4×4 pixels is obtained.

By orthogonally transforming also the padded image block 191 in a manner similar to that of the complete image block 181, an orthogonally transformed block 193 is obtained. The orthogonally transformed block obtained by orthogonally transforming the padded image block 191 will be referred to as a "padded orthogonally transformed block" 193. In a manner similar to that of the complete orthogonally transformed block 182, orthogonal transform coefficients C65 to C68, C73 to C76, C81 to C84 and C89 to C92 that reside in a 4×4 block 194 are decided upon as orthogonal transform coefficients used in order to generate a reduced image. By subjecting these orthogonal transform coefficients C65 to C68, C73 to C76, C81 to C84 and C89 to C92 to an inverse orthogonal transformation, a second reduced image block 197 of 4×4 pixels is obtained.

Since 9 pixels horizontally and 8 pixels vertically constitute the original image (a portion thereof), a reduced image of 4.5 pixels horizontally and 4 pixels vertically will be generated if the original image is reduced to one-half size. Since the fraction must be raised, however, a reduced image of 5 pixels horizontally and 4 pixels vertically must be produced. Consequently, a portion 199 consisting of pixels p2 to p4, p6 to p8, p10, to p12 and p14 to p16 in second to fourth columns is trimmed from the second reduced image block 197 to thereby extract a portion 196 composed of pixels p1, p5, p9, p13 of the first column. By combining the extracted portion 196 composed of pixels p1, p5, p9, p13 of the first column and the first reduced image block 184, a reduced image (a portion thereof) 200 that is one-half the size of the original image is produced.

A problem, however, is that the portion 196 composed of the pixels p1, p5, p9 and p13 of the first column extracted from the second reduced image block 197 is influenced by the padding data Ip not contained in the original image. As a consequence, there are instances where noise such as an unwanted line appears in the image portion 196 represented by the pixels p1, p5, p9 and p13 at the edge of the reduced image 200 generated.

Since JPEG-compliant compression involves orthogonal transformation using an image block of 8×8 pixels, the orthogonally transformed block obtained by this transformation also is composed of 64 orthogonal transform coefficients in an 8×8 array. In a case where image reduction is applied to an image utilizing orthogonal transform coefficients, the horizontal or vertical length of the reduced image will not be an integral number of pixels when the number of pixels in the horizontal or vertical direction of the original image before compression is not a multiple of eight. As a consequence, the width or height of an edge pixel representing the edge of the reduced image obtained by reduction processing theoretically will have a length indicated by a decimal fraction. Since a length indicated by a decimal fraction cannot be expressed, round-up processing is executed so that the end pixel will be expressed by one pixel. Since the edge portion in the theoretically reduced image is indicated by one pixel despite the fact that it does not have a width or height equivalent to one pixel (i.e., the width or height is a non-integral or fractional pixel), the edge portion of the reduced image takes on an unnatural appearance.

SUMMARY OF THE INVENTION

Accordingly, an object of the present invention is to prevent the occurrence of noise produced by padding data.

Another object of the present invention is to reduce the occurrence of an unnatural appearance at an edge portion of a reduced image.

An image reducing apparatus according to a first aspect of the present invention comprises: an orthogonal transform coefficient deciding device (orthogonal transform coefficient deciding means) for deciding orthogonal transform coefficients, which are used to generate a reduced image, in accordance with a reduction ratio from among orthogonal transform coefficients that constitute a complete orthogonally transformed block [in a case where an image block is a rectangular image block having pixels in a (prescribed number)× (prescribed number) array, the reduction ratio is, e.g., 1/(the prescribed number)], wherein the complete orthogonally transformed block is obtained by orthogonally transforming a complete image block having a predetermined plurality of pixels, from among a plurality of orthogonally transformed blocks each composed of a plurality of orthogonal transform coefficients that are the result of orthogonally transforming each of a plurality of image blocks that form one frame of an original image, each image block being composed of a plurality of pixels; a first reduced image block generating device (first reduced image block generating means) for executing inverse orthogonal transformation processing using the orthogonal transform coefficients decided by the orthogonal transform coefficient deciding device, thereby generating a first reduced image block; a padded image block restoring device (padded image block restoring means) for applying inverse orthogonal transformation processing to a padded orthogonally transformed block obtained by orthogonally transforming a padded image block that is the result of adding padding data to a deficient image block, which does not possess a predetermined plurality of pixels, among the plurality of orthogonally transformed blocks in such a manner that the deficient image block will have the predetermined plurality of pixels, thereby restoring the padded image block; a modified image block generating device (modified image block generating means) for generating a modified image block obtained by replacing the padding data, which is included in the padded image block restored by the padded image block restoring device, with data that is the result of copying original image data included in the padded image block; a second reduced image block generating device (second reduced image block generating means) for generating a second reduced image block by reducing the modified image block, which has been generated by the modified image block generating device, in accordance with the reduction ratio; and a reduced image generating device (reduced image generating means) for generating a reduced image, which conforms to the reduction ratio, from the first reduced image block generated by the first reduced image block generating device and the second reduced image block generated by the second reduced image block generating device.

The first aspect of the present invention also provide a reduced image generating method suited to the above-described reduced image apparatus. Specifically, the method comprises the steps of: an orthogonal transform coefficient deciding device deciding orthogonal transform coefficients, which are used to generate a reduced image, in accordance with a reduction ratio from among orthogonal transform coefficients that constitute a complete orthogonally transformed block, wherein the complete orthogonally transformed block is obtained by orthogonally transforming a complete image block having a predetermined plurality of pixels, from among a plurality of orthogonally transformed blocks each composed of a plurality of orthogonal transform coefficients that are the result of orthogonally transforming each image block of a plurality of image blocks that form one frame of an original image, each image block being composed of a plurality of pixels; a first reduced image block generating device executing inverse orthogonal transformation processing using the orthogonal transform coefficients decided by the orthogonal transform coefficient deciding device, thereby generating a first reduced image block; a padded image block restoring device applying inverse orthogonal transformation processing to a padded orthogonally transformed block obtained by orthogonally transforming a padded image block that is the result of adding padding data to a deficient image block, which does not possess the predetermined plurality of pixels, among the plurality of orthogonally transformed blocks in such a manner that the deficient image block will have the predetermined plurality of pixels, thereby restoring the padded image block; a modified image block generating device generating a modified image block obtained by replacing the padding data, which is included in the padded image block restored by the padded image block restoring device, with data that is the result of copying original image data included in the padded image block; a second reduced image block generating device generating a second reduced image block by reducing the modified image block, which has been generated by the modified image block generating device, in accordance with the reduction ratio; and a reduced image generating device generating a reduced image, which conforms to the reduction ratio, from the first reduced image block generated by the first reduced image block generating device and the second reduced image block generated by the second reduced image block generating device.

The first aspect of the present invention further provides a computer program for controlling the above-described image reducing apparatus.

In accordance with the first aspect of the present invention, orthogonal transform coefficients used in a reduced image are decided in accordance with a reduction ratio with regard to a complete orthogonally transformed block. Inverse orthogonal transformation processing is executed using the orthogonal transform coefficients decided and a first reduced image block is generated.

Inverse orthogonal transformation processing is executed with regard to a padded orthogonally transformed block to thereby restore a padded image block. Since padding data has been added to the restored padded image block, the original image data is copied and the copied original image data is substituted for the padding data. A modified image block is generated by substituting the copied original image data for the padding data. A second reduced image block is generated by reducing the modified image block.

A reduced image conforming to the reduction ratio is generated from the first and second reduced image blocks thus generated.

In accordance with the first aspect of the present invention, a padded image block is restored from a padded orthogonally transformed block and the padding data is replaced with the result of copying the original image data, after which the second reduced image block is generated. This means that the influence of the padding data is eliminated from the second reduced image block that has been generated. Accordingly, the reduced image generated from the first and second reduced image blocks is devoid of the influence of the padding data and noise ascribable to padding data can be eliminated.

An image reducing apparatus according to a second aspect of the present invention comprises: an orthogonal transform coefficient deciding device (orthogonal transform coefficient deciding means) for deciding orthogonal transform coefficients used when an image is reduced to n/(a prescribed number of pixels) (where n is a natural number less than the prescribed number of pixels) in horizontal and vertical directions, with regard to each orthogonally transformed block of a plurality of orthogonally transformed blocks composed of a plurality of orthogonal transform coefficients that are the result of orthogonally transforming each image block of a plurality of image blocks that form one frame of an original image, each image block being a rectangular image block comprising the prescribed number of pixels in both the horizontal and vertical directions; a reduced image block generating device (reduced image block generating means) for applying inverse orthogonal transformation processing to a plurality of orthogonally transformed blocks using the orthogonal transform coefficients decided by the orthogonal transform coefficient deciding device, thereby generating a plurality of reduced image blocks; a padded reduced image block modifying device (padded reduced image block modifying means) for operating upon a padded reduced image block obtained, from among a plurality of reduced image blocks generated by the reduced image block generating device, based upon a padded image block that is the result of adding padding data to an image block among the plurality of image blocks in such a manner that this image block will have the prescribed number of pixels in both the horizontal and vertical directions, wherein in a case where an edge pixel corresponding to an edge of a reduced image among the pixels included in the padded reduced image block should be a fractional pixel, the padded reduced image block modifying device executes addition processing for deleting this edge pixel by adding the level of the edge pixel to the level of a pixel of the reduced image adjacent to this edge pixel when the fractional value is less 0.5, and adding the level of the pixel of the reduced image adjacent to the fractional pixel to the level of this edge pixel when the fractional value is 0.5 or greater, and in a case where the edge pixel corresponding to the edge of the reduced image is originally an integral pixel, the padded reduced image block modifying device halts the addition processing; and a reduced image generating device (reduced image generating means) for generating a reduced image using a complete reduced image block from among the plurality of reduced image blocks generated by the reduced image block generating device from which padded reduced image blocks have been excluded, a padded reduced image block to which the addition processing has been applied by the padded reduced image block modifying device, and a padded reduced image block to which application of the addition processing by the padded reduced image block modifying device has been halted.

The second aspect of the present invention also provide a reduced image generating method suited to the above-described reduced image apparatus. Specifically, the method comprises the steps of: an orthogonal transform coefficient deciding device deciding orthogonal transform coefficients used when an image is reduced to n/(a prescribed number of pixels) (where n is a natural number less than the prescribed number of pixels) in both and horizontal and vertical directions, with regard to each orthogonally transformed block of a plurality of orthogonally transformed blocks composed of a plurality of orthogonal transform coefficients that are the result of orthogonally transforming each image block of a plurality of image blocks that form one frame of an original image, each image block being a rectangular image block comprising the prescribed number of pixels in both the horizontal and vertical directions; a reduced image block generating device applying inverse orthogonal transformation processing to a plurality of orthogonally transformed blocks using the orthogonal transform coefficients decided by the orthogonal transform coefficient deciding device, thereby generating a plurality of reduced image blocks; a padded reduced image block modifying device operating upon a padded reduced image block obtained, from among a plurality of reduced image blocks generated by said reduced image block generating device, based upon a padded image block that is the result of adding padding data to an image block among the plurality of image blocks in such a manner that the padded image block will have the prescribed number of pixels in both the horizontal and vertical directions, wherein in a case where an edge pixel corresponding to an edge of a reduced image among the pixels included in the padded reduced image block should be a fractional pixel, the padded reduced image block modifying device executes addition processing for deleting this edge pixel by adding the level of the edge pixel to the level of a pixel of the reduced image adjacent to this edge pixel when the fractional value is less 0.5, and adding the level of the pixel of the reduced image adjacent to the fractional pixel to the level of this edge pixel when the fractional value is 0.5 or greater, and in a case where the edge pixel corresponding to the edge of the reduced image is originally an integral pixel, the padded reduced image block modifying device halts the addition processing; and a reduced image generating device generating a reduced image using a complete reduced image block from among the plurality of reduced image blocks generated by the reduced image block generating device from which padded reduced image blocks have been excluded, a padded reduced image block to which the addition processing has been applied by the padded reduced image block modifying device, and a padded reduced image block to which application of the addition processing by the padded reduced image block modifying device has been halted.

The second aspect of the present invention further provides a computer program for controlling the above-described image reducing apparatus.

In accordance with the second aspect of the present invention, orthogonal transform coefficients used when an image is reduced are decided from among orthogonal transform coefficients that form an orthogonally transformed block. A plurality of reduced image blocks are generated by executing inverse transformation processing using the orthogonal transform coefficients decided. With regard to a padded reduced image block obtained based upon a padded image block to which padding data has been added so as to have a prescribed number of pixels in both the horizontal and vertical directions, it is determined whether an edge pixel corresponding to an edge of the reduced image block among the pixels included in this padded reduced image block should be a fractional pixel. In a case where the edge pixel should be a fractional pixel, addition processing is executed. When the fractional value is less 0.5, the addition processing deletes this edge pixel by adding the level of the edge pixel to the level of a pixel of the reduced image adjacent to this edge pixel. When the fractional value is 0.5 or greater, the addition processing adds the level of the pixel of the reduced image adjacent to the fractional pixel to the level of this edge pixel. In a case where the edge pixel corresponding to the edge of the reduced image is originally an integral pixel, this addition processing is halted. A reduced image is generated using a complete reduced image block, a padded reduced image block to which the addition processing has been applied, and a padded reduced image block to which application of the addition processing has been halted.

Thus, in a case where an edge pixel corresponding to the edge of a reduced image should be a fractional pixel, addition processing is executed. When the non-integral value is less 0.5, the addition processing deletes this edge pixel by adding the level of the edge pixel to the level of a pixel of the reduced image adjacent to the fractional pixel. When the fractional value is 0.5 or greater, the addition processing adds the level of the pixel of the reduced image adjacent to the fractional pixel to the level of this edge pixel. Even if the edge portion in a theoretically reduced image is indicated by one pixel despite the fact that the edge portion does not have a width or height equivalent to one pixel, the level of this one pixel at the edge portion is adjusted to a level that will not be noticeable in comparison with nearby pixels. As a result, it is possible to reduce the occurrence of an unnatural appearance at an edge portion of a reduced image.

The reduced image block generating device may include a padded image block restoring device (padded image block restoring means) for applying inverse orthogonal transformation processing to a modified orthogonally transformed block obtained by orthogonally transforming a padded image block, thereby restoring the padded image block; and a modified image block generating device (modified image block generating means) for generating a modified image block obtained by replacing the padding data, which is included in the padded image block restored by the padded image block restoring device, with data that is the result of copying original image data included in the padded image block; wherein the modified image block generated by the modified image block generating device is reduced in accordance with a reduction ratio to thereby generate a reduced image block.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 7A to 7D illustrate the manner in which a reduced image is generated according to the second embodiment;

FIGS. 8A to 8D illustrate the manner in which a reduced image is generated according to the second embodiment;

FIG. 15 illustrates processing for reducing an image block according to the prior art.

DESCRIPTION OF THE PREFERRED EMBODIMENTS

Preferred embodiments of the present invention will now be described with reference to the accompanying drawings.

Figure 1:
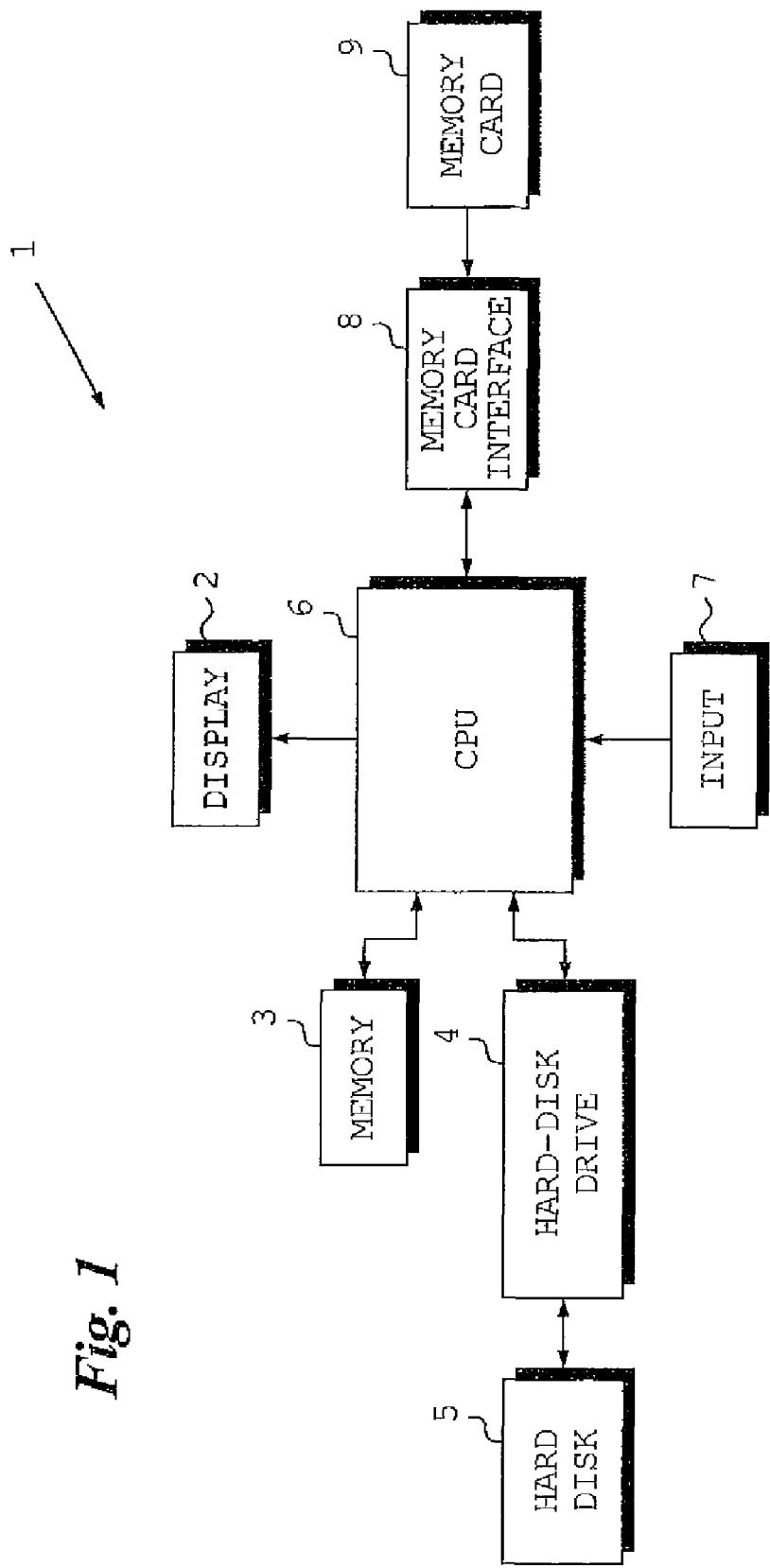
FIG. 1 is a block diagram illustrating the electrical configuration of an image reducing apparatus according to a first embodiment of the present invention.

FIG. 1 is a block diagram illustrating the electrical configuration of an image reducing apparatus 1 according to a first embodiment of the present invention.

The overall operation of the image reducing apparatus 1 is controlled by a CPU 6.

The image reducing apparatus 1 includes a memory card interface 8. Image data that is the result of JPEG compression has been stored on a memory card 9. The compressed image data that has been stored on the memory card 9 is read by the memory card interface 8. The compressed image data that has been read is decompressed and the image represented by the compressed image data is displayed on the display screen of a display unit 2. In this embodiment, a reduced image of an image represented by compressed image data is generated. The reduced image generated is also displayed on the display screen of the display unit 2. The method of generating a reduced image will be described in detail later. Further, if the processing program of the image reducing apparatus 1 has been stored on the memory card 9, then this program can be read and installed in the image reducing apparatus 1. Naturally, the processing program can also be installed in the image reducing apparatus 1 by some other method.

The image reducing apparatus 1 includes an input unit 7 such as a keyboard. A command that has been output from the input unit 7 is applied to the CPU 6.

The image reducing apparatus 1 further includes a hard disk 5 and a hard-disk drive 4 for reading compressed image data, etc. r that has been stored on the hard disk 5 or for writing compressed image data, etc., to the hard disk 5. An image represented by compressed image data that has been recorded on the hard disk 5, as well as the reduced image of this image, can also be displayed on the display screen of the display unit 2.

The image reducing apparatus 1 further includes a memory 3 for storing image data, etc., temporarily.

Figure 2:
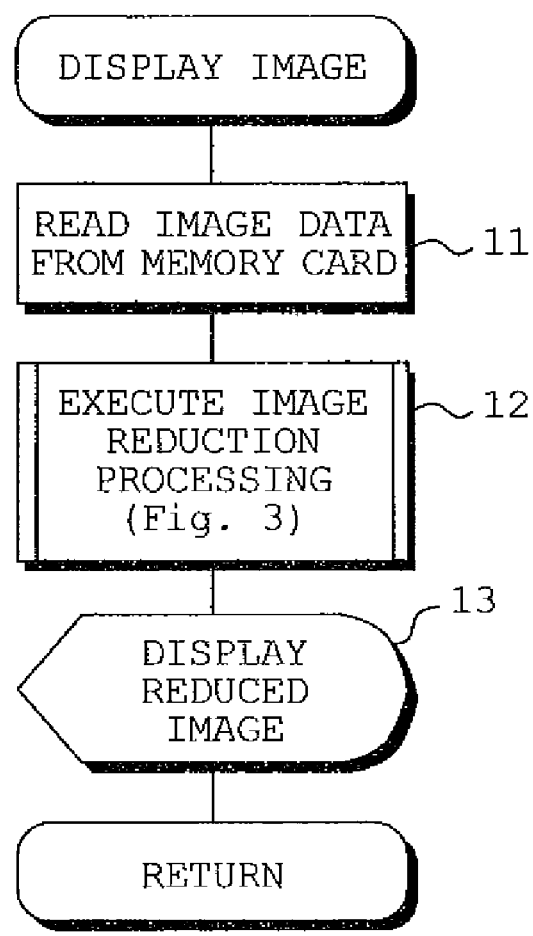
FIG. 2 is a flowchart illustrating image display processing according to the first embodiment.

FIG. 2 is a flowchart illustrating image display processing.

In the processing shown in FIG. 2, it is assumed that compressed image data based upon JPEG has been recorded on the memory card 9 and that a reduced image of the image represented by this compressed image data is displayed. The compression method need not necessarily be compliant with JPEG so long as it is a compression method in which an orthogonal transformation is carried out.

Desired compressed image data is read from compressed image data representing a number of frames of images that have been recorded on the memory card 9 (step 11). By way of example, by designating the data name (file name) of compressed image data, compressed image data having the designated data name is read from the memory card 9.

The compressed image data read is subjected to image reduction processing (step 12). The details of this image reduction processing will be described later. The reduced image generated by image reduction processing is displayed on the display screen of the display unit 2 (step 13). The reduction ratio of the reduced image may be determined in advance or it may be so arranged that the reduction ratio can be input from the input unit 7.

With compression based upon the JPEG standard, as mentioned earlier, one frame of an image is divided into image blocks of 8×8 pixels each, and an orthogonal transformation is carried out in units of the individual image blocks. An orthogonally transformed block composed of 64 orthogonal transform coefficients in an 8×8 array is obtained by the orthogonal transformation. The result of encoding the orthogonally transformed block has been recorded on the memory card 9 as compressed image data. This embodiment is such that in a case where an image block is a complete image block, reduction processing is executed through a method the same as that described above (see FIG. 15). What will be described below is primarily reduction processing executed in a case where an image block is a deficient image block.

Figure 3:
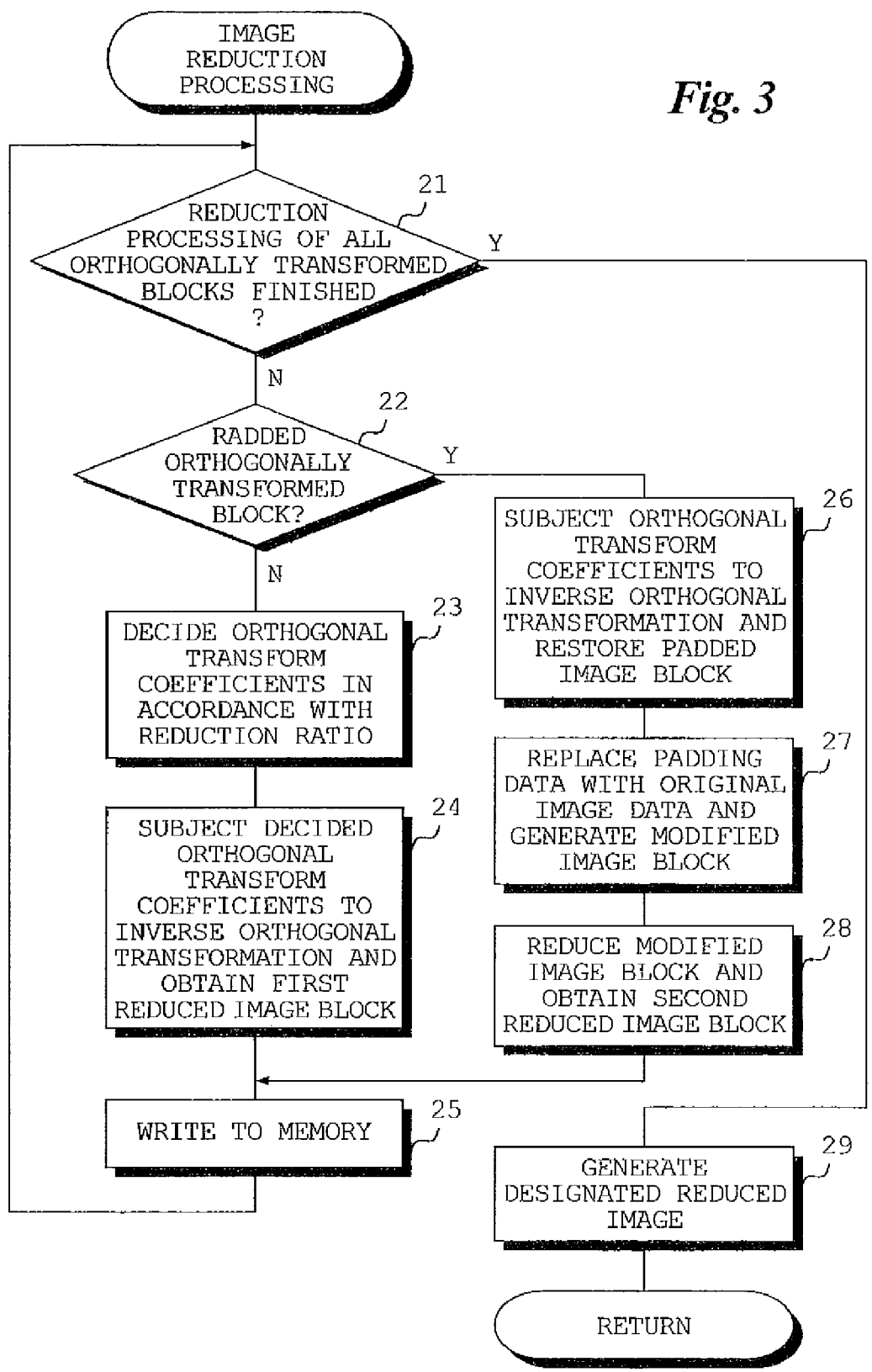
FIG. 3 is a flowchart illustrating image reduction processing according to the first embodiment.
Figure 4:
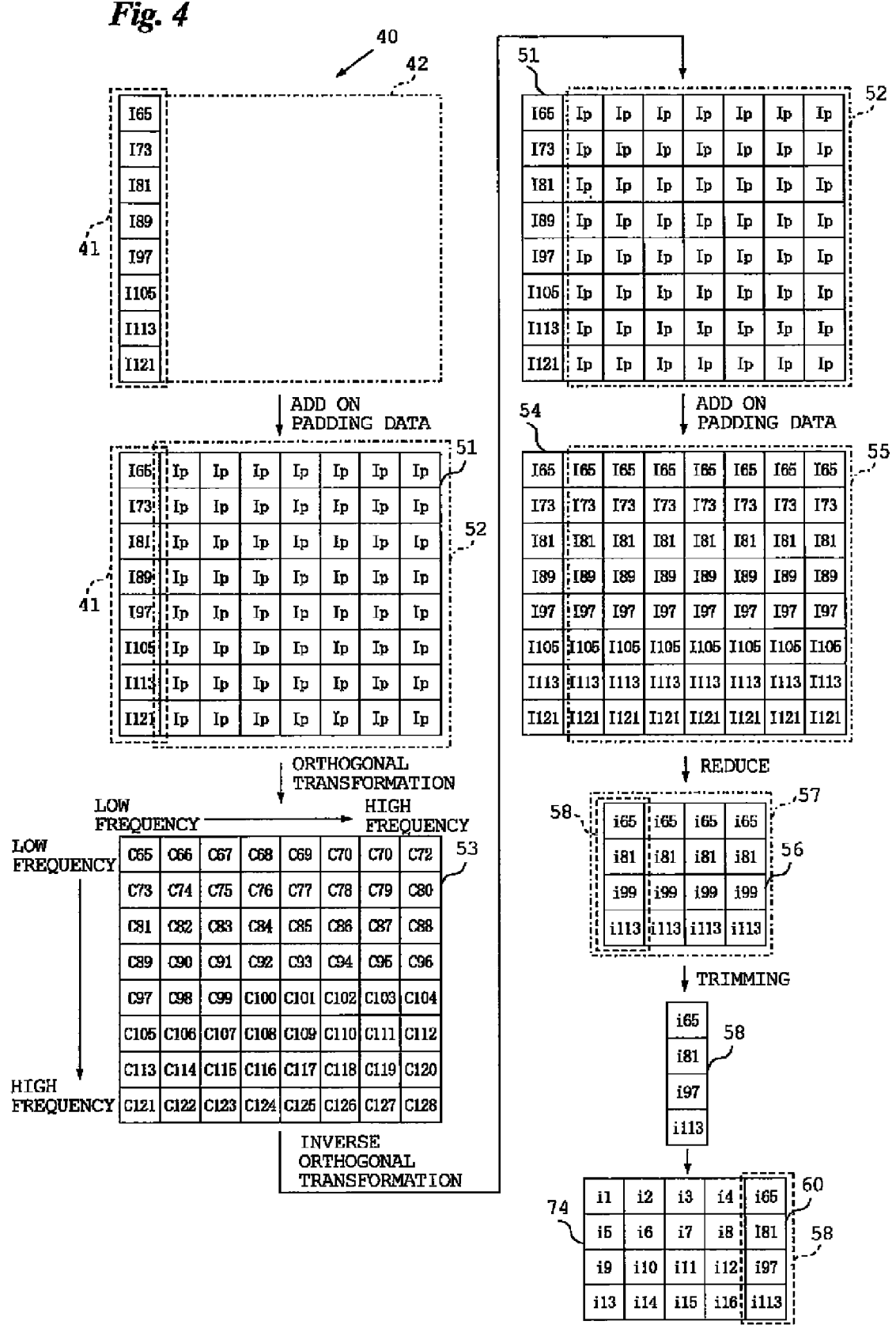
FIG. 4 illustrates processing for reducing a padded image block according to the first embodiment.

FIG. 3 is a flowchart illustrating processing for reducing an image (this is the processing executed at step 12 in FIG. 2). FIG. 4 illustrates the manner in which a reduced image is generated.

If the number of pixels in an original image is not divisible by eight in a case where the original image has been divided into a number of image blocks, a deficient image block 40 is generated, as illustrated at the upper left in FIG. 4. The deficient image block 40 is a block that cannot be formed into an image block of 64 pixels in an array of 8×8 pixels from only a portion 41 of the original image, namely pixels I65, I73, I81, I89, I97, I105, I113 and I121 forming part of the original image. In order for the deficient image block 40 to be made an image block of 64 pixels in an array of 8×8 pixels, it is necessary that padding data be added to a portion 42 of the image block that lacks pixels.

By adding a portion 52 composed of padding data Ip to the deficient image block 40, a padded image block 51 composed of 64 pixels in an array of 8×8 pixels is generated. A padded orthogonally transformed block 53 composed of 64 orthogonal transform coefficients C65 to C128 in an 8×8 array is generated by orthogonally transforming the padded image block 51. Data obtained by encoding the padded orthogonally transformed block 53 is image data that has been compressed based upon JPEG compression. Such compressed image data has been recorded on the memory card 9.

In this embodiment, orthogonally transformed blocks constituting one frame of an image are read and all of the orthogonally transformed blocks are subjected to reduction processing (step 21 in FIG. 3). If reduction processing of all orthogonally transformed blocks has not finished ("NO" at step 21 in FIG. 3), then it is determined whether a read orthogonally transformed block is a padded orthogonally transformed block (step 22 in FIG. 3).

If the block is not a padded orthogonally transformed block ("NO" at step 22 in FIG. 3), this means that the block is a complete orthogonally transformed block and therefore the orthogonal transform coefficients are decided in accordance with the reduction ratio (step 23 in FIG. 3), as illustrated in FIG. 4. The orthogonal transform coefficients decided are subjected to an inverse orthogonal transformation to thereby obtain a first reduced image block (first reduced image data) (step 24 in FIG. 3). The first reduced image data obtained is written to the memory 3 and stored here temporarily (step 25 in FIG. 3).

If the block is the padded orthogonally transformed block 53 ("YES" at step 22 in FIG. 3), all 64 of the orthogonal transform coefficients C65 to C128 in the 8×8 array constituting the padded orthogonally transformed block 53 are subjected to an inverse orthogonal transformation to thereby restore the padded image block 51 (in actuality, this entails decoding) (step 26 in FIG. 3), as shown in FIG. 4. Since the padded image block 51 includes the portion 52 to which the padding data Ip has been added, the portion 52 is replaced with a portion 55 obtained by copying the original image portion 41 (step 27 in FIG. 3). A modified image block 54 is generated from the padded image block 51 by this substitution.

By reducing the generated modified image block 54 in accordance with the reduction ratio, a second reduced image block (second reduced image data) 56 is obtained (step 28 in FIG. 3). Processing for reducing the modified image block 54 can utilize area averaging, bilinear or bicubic processing. The second reduced image block 56 generated is written to the memory 3 (step 25 in FIG. 3).

When reduction processing of all orthogonally transformed blocks constituting the one frame of the image end ("YES" at step 21 in FIG. 3), a reduced image portion 57 of the portion 55 that was obtained by copying the original image portion 41 is trimmed in such a manner that a reduced image portion 58 of the original image portion 41 will remain from the second reduced image block 56. As a result, the reduced image portion 58 of the original image portion 41 is obtained. A reduced image 60 (a portion thereof) of the original image is generated by combining the reduced image portion 58 and the first reduced image block 74 that have been obtained.

Since the pixels i65, i81, i97 and i113 that constitute the reduced image portion 58 have been generated from the pixels I65, I73, I81, I89, I97, I105, I113 and I121 originally contained in the original image, it is possible to prevent noise ascribable to padding data from occurring at the edge portion of the generated reduced image.

Figure 5:
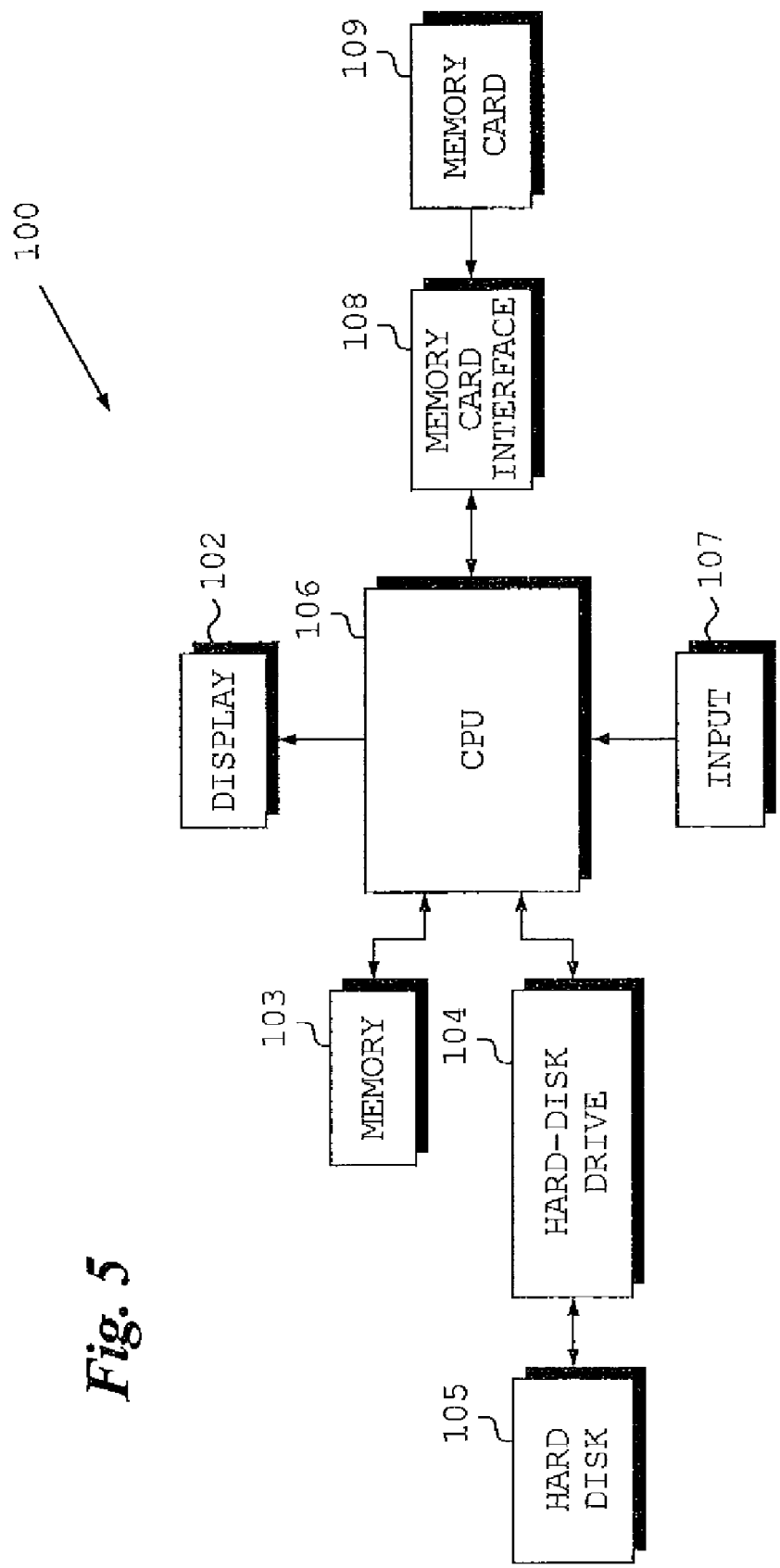
FIG. 5 is a block diagram illustrating the electrical configuration of an image reducing apparatus according to a second embodiment of the present invention.

FIG. 5 is a block diagram illustrating the electrical configuration of an image reducing apparatus 1 according to a second embodiment of the present invention.

The overall operation of the image reducing apparatus 100 is controlled by a CPU 106.

The image reducing apparatus 100 includes a memory card interface 108. Image data that is the result of JPEG compression has been stored on a memory card 109. The compressed image data that has been stored on the memory card 109 is read by the memory card interface 108. The compressed image data that has been read is decompressed and the image represented by the compressed image data is displayed on the display screen of a display unit 102. In this embodiment, a reduced image of an image represented by compressed image data is generated. The reduced image generated is also displayed on the display screen of the display unit 102. The method of generating a reduced image will be described in detail later. Further, if the processing program of the image reducing apparatus 100 has been stored on the memory card 109, then this program can be read and installed in the image reducing apparatus 100. Naturally, the processing program can also be installed in the image reducing apparatus 100 by some other method.

The image reducing apparatus 100 includes an input unit 107 such as a keyboard. A command that has been output from the input unit 107 is applied to the CPU 106.

The image reducing apparatus 100 further includes a hard disk 105 and a hard-disk drive 104 for reading compressed image data, etc., that has been stored on the hard disk 105 or for writing compressed image data, etc., to the hard disk 105. An image represented by compressed image data that has been recorded on the hard disk 105, as well as the reduced image of this image, can also be displayed on the display screen of the display unit 102.

The image reducing apparatus 100 further includes a memory 103 for storing image data, etc., temporarily.

Figure 6:
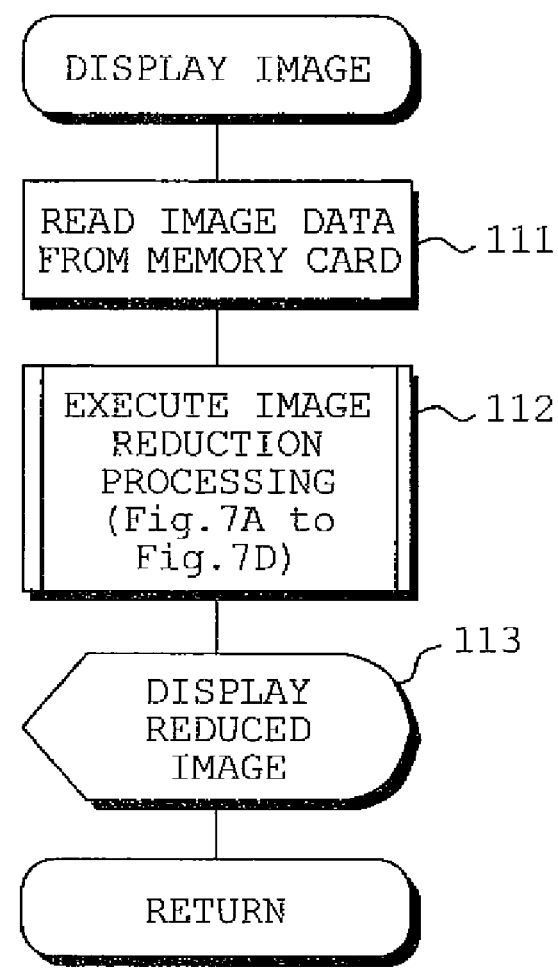
FIG. 6 is a flowchart illustrating image display processing according to the second embodiment.

FIG. 6 is a flowchart illustrating image display processing.

In the processing shown in FIG. 6, it is assumed that compressed image data based upon JPEG has been recorded on the memory card 109 and that a reduced image of the image represented by this compressed image data is displayed. The compression method need not necessarily be compliant with JPEG so long as it is a compression method in which an orthogonal transformation is carried out.

Desired compressed image data is read from compressed image data representing a number of frames of images that have been recorded on the memory card 109 (step 111). By way of example, by designating the data name (file name) of compressed image data, compressed image data having the designated data name is read from the memory card 109.

The compressed image data read is subjected to image reduction processing (step 112). The details of this image reduction processing will be described later. The reduced image generated by image reduction processing is displayed on the display screen of the display unit 102 (step 113). The reduction ratio of the reduced image may be determined in advance or it may be so arranged that the reduction ratio can be input from the input unit 107.

FIGS. 7A to 7D, 8A to 8D and 9A to 9F illustrate the principle of reduced-image generation according to the second embodiment.

FIG. 7A illustrates an original image 115 before the generation of a compressed image.

In a case where compression based upon JPEG is applied to the original image 115, the original image 115 is split into a number of image blocks 116 each of which is composed of 64 pixels in an array of eight pixels (the prescribed number of pixels) in each of the horizontal and vertical directions. Assume that blocks 120 on the right edge of the original image 115 are not 8×8 pixel blocks but instead have become blocks composed of nine pixels in the horizontal direction and eight pixels in the vertical direction.

FIG. 7B illustrates one block 120 from among the blocks 120 on the right edge of the original image 115 in FIG. 7A.

The block 120 is composed of nine pixels in the horizontal direction and eight pixels in the vertical direction, as mentioned above. Among the pixels that form the block 120, pixels 122 and 132 filled in black are pixels in which the pixel level is 100%, and white pixels 123 and 133 are pixels in which the pixel level is 0%. The pixels forming the block 120 can be divided into an image block 121 of 8×8 pixels on the left side and a pixel group 130 composed of one column of eight pixels on the right side.

FIG. 7C illustrates the image block 121 of 8×8 pixels on the left side from among the pixels that form the block 120 shown in FIG. 7B. The image block 121 depicted in FIG. 7C is such that the pixels 122 or 123 constituting the image block 121 all represent the original image 115 shown in FIG. 7A and will be referred to as a "complete image block".

FIG. 7D illustrates an image block 131 in which the pixel group 130 composed of the one column of eight pixels on the right side among the pixels forming the block 120 in FIG. 7B is included in one column on the leftmost side. Padding data (pixels) 134 has been added on the right side of the pixel group 130 situated on the leftmost side of the image block 131. Since compression based upon JPEG is executed in units of image blocks composed of 64 pixels in an array of 8×8 pixels, the data that is added on so that an image block will consist of 64 pixels in an array of 8×8 pixels is the padding data 134. The block 131 to which the padding data has been added will be referred to as a "padded image block".

FIG. 8A illustrates a complete orthogonally transformed block 125 obtained by orthogonally transforming the image block 121 shown in FIG. 7C. The complete orthogonally transformed block 125 contains 64 orthogonal transform coefficients C1 to C64 in an 8×8 array. The closer an orthogonal transform coefficient is to the upper left, the lower the frequency component; the closer the orthogonal transform coefficient is to the lower right, the higher the frequency component. The complete orthogonally transformed block 125 is encoded and recorded on a recording medium.

FIG. 8C illustrates a padded orthogonally transformed block 135 obtained by orthogonally transforming the padded image block 131 shown in FIG. 7D. Since the padded image block 131 also is composed of 64 pixels in an array of 8×8 pixels, the padded orthogonally transformed block 135 also contains 64 orthogonal transform coefficients C65 to C128 in an 8×8 array.

The complete orthogonally transformed block 125 and the padded orthogonally transformed block 135 shown in FIGS. 8A and 8C, respectively, have been encoded and recorded on the memory card 109.

When a reduced image of a JPEG-compressed original image is generated, orthogonal transform coefficients are decided with regard to the complete orthogonally transformed block 125. Specifically, from among the orthogonal transform coefficients C1 to C64 that constitute the complete orthogonally transformed block 125, orthogonal transform coefficients are decided from among those of the low-frequency components in accordance with the reduction ratio, as illustrated in FIG. 8A. For example, assume a case where a reduced image that will be one-half the size of the original image in both the horizontal and vertical directions is generated. Since the complete orthogonally transformed block 125 is composed of the orthogonal transform coefficients C1 to C64 in the 8×8 array, orthogonal transform coefficients C1 to C4, C9 to C12, C17 to C20 and C25 to C28 contained in a 4×4 block 125A of half size in both the horizontal and vertical directions are decided upon as the orthogonal transform coefficients to be used in generating the reduced image.

A complete reduced image block 126 shown in FIG. 8B is obtained by applying an inverse orthogonal transformation to the 16 orthogonal transform coefficients C1 to C4, C9 to C12, C17 to C20 and C25 to C28 in the 4×4 array decided. The complete reduced image block 126 includes all-white pixels 127, pixels 128 indicated by cross hatching and pixels 129 indicated by vertical stripes. The all-white pixels 127 are pixels in which the pixel level is 0%, similar to the white pixels 123 contained in the complete image block 121 shown in FIG. 7C. The pixels 128 indicated by cross hatching are pixels in which the pixel level is 75%, and the pixels 129 indicated by vertical stripes are pixels in which the pixel level is 25%. The complete reduced image block 126 is considered to be composed of pixels obtained by reducing four mutually adjacent pixels from among the pixels 122 or 123 that constitute the complete image block 121 shown in FIG. 7C. Therefore, it will be appreciated that by generating a reduced image block from the complete orthogonally transformed block 125 obtained by orthogonally transforming the image block 121 shown in FIG. 7C, the complete reduced image block 126 shown in FIG. 8B will be generated.

With regard to the padded orthogonally transformed block 135 illustrated in FIG. 8C, an inverse orthogonal transformation is applied upon deciding upon all of the orthogonal transform coefficients C65 to C128, which form the padded orthogonally transformed block 135, as the orthogonal transform coefficients to be used in the reduced image. By applying the inverse orthogonal transformation to the padded orthogonally transformed block 135 shown in FIG. 5C, the padded image block 131 shown in FIG. 8D (which is the same as the padded image block shown in FIG. 7D) is restored. In this embodiment, the padding data 134 forming the padded image block 131 is replaced with pixels obtained by copying the pixels 132 and 133 that constitute the original image 115.

Figure 9B:
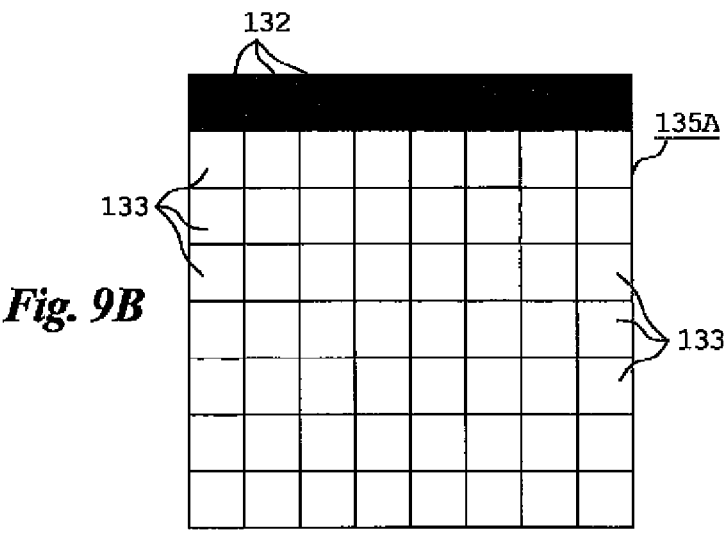
FIGS. 9A to 9F illustrate the manner in which a reduced image is generated according to the second embodiment.

FIG. 9B illustrates a modified padded image block 135A obtained by replacing the padding data with the pixels 132 and 133 that form the original image 115.

The first row of the modified padded image block 135 is composed of the pixels 132 whose pixel level is 100%. Likewise, in the second to eighth rows, the padding data 134 is replaced in such a manner that these rows become the pixels 133 whose pixel level is 0%. The modified padded image block 135A is reduced.

Figure 9C:
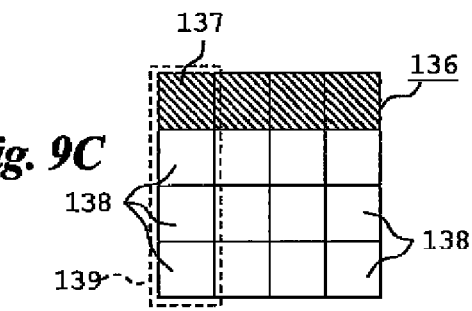

FIG. 9C illustrates a padded reduced image block 136 obtained by reducing the modified padded image block 135A.

The padded reduced image block 136 includes pixels 137 whose pixel level is 50% and pixels 138 whose pixel level is 0%. It will be understood that by reducing the modified padded image block 135A shown in FIG. 9B, the padded reduced image block 136 shown in FIG. 9C is obtained.

Pixels forming the original image 115 make up the column of the pixel group 130 on the leftmost side of the padded image block 131 shown in FIG. 7D. If the original image 115 is reduced to one-half the size in both the horizontal and vertical directions, then both the width and height of the pixel group 130 of this one column are also halved. Accordingly, although a reduced block of one-half pixel in the horizontal direction and four pixels in the vertical direction must be extracted from the padded reduced image block 136, a fractional pixel cannot be extracted. As illustrated in FIG. 9D, therefore, an adjusted pixel block 139 having a rounded-up width is extracted from the padded reduced image block 136.

Figure 9A:
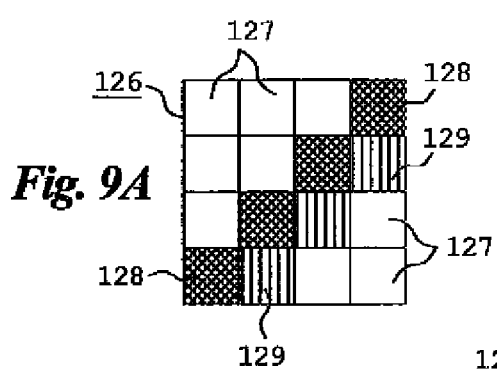
Figure 9D:
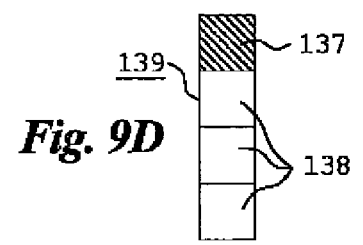
Figure 9E:
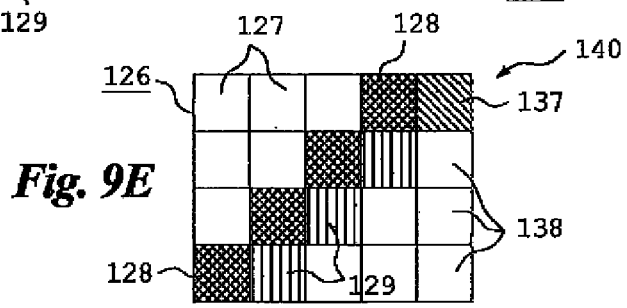

As illustrated in FIG. 9E, the complete reduced image block 126 shown in FIG. 9A and the adjusted pixel block 139 shown in FIG. 9D are combined, thereby generating a reduced image block 140 of the image block shown in FIG. 7B.

Figure 9F:
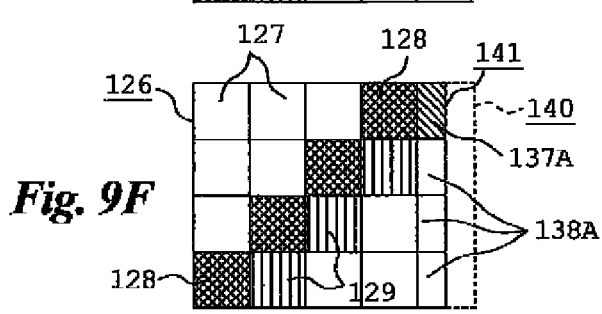

The image block 120 shown in FIG. 7B has nine pixels in the horizontal direction and eight pixels in the vertical direction. If the image block 120 is reduced to halve the size in both the horizontal and vertical directions, what should be obtained is a reduced image block 141 having 4.5 pixels in the horizontal direction and 4.0 pixels in the vertical direction, as illustrated in FIG. 9F. However, since a reduced image block having a fractional pixel number cannot be generated, the adjusted pixel block 139 having the rounded-up pixel number is extracted from the padded reduced image block 136 and the reduced image block 140 having five pixels in the horizontal direction and four pixels in the vertical direction, as shown in FIG. 9E, is generated.

Fractional pixels rightfully having a width of 0.5 pixel, as indicated by pixels 137A, 138A on the right edge in FIG. 9F, have become pixels having a width of 1.0 pixel, as indicated by pixels 137, 138 on the right edge of FIG. 9E (these pixels 137, 138 will be referred to as "edge pixels" since they correspond to the edge of the reduced image. As a consequence, these edge pixels become conspicuous and produce an unnatural appearance when the reduced image is viewed. In order to deal with this, the processing described next is executed in this embodiment.

In the embodiment set forth above, the padded image block 131 is restored with regard to the padded orthogonally transformed block 135, thereby generating the padded reduced image block 136. However, rather than restoring the padded image block 131, orthogonal transform coefficients conforming to the reduction ratio may be decided and the padded reduced image block may be generated in a manner similar to that of the complete orthogonally transformed block 125.

Figure 10:
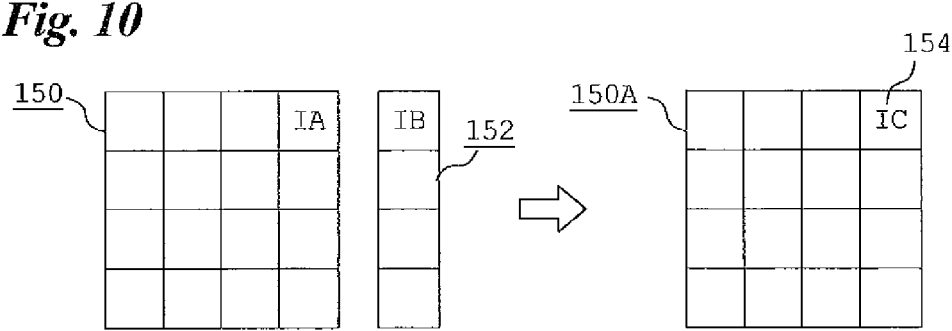
FIG. 10 illustrates processing for adjusting pixel level according to the second embodiment.

FIG. 10 illustrates processing in a case where the true width (a fractional value) of an edge pixel forming an adjusted pixel block extracted from a padded reduced image block is less than 0.5 pixel.

In a case where the true width of an edge pixel IB forming an adjusted pixel block 152 is less than 0.5 pixel, the edge pixel IB is added to a pixel IA, which is on the right edge of a complete reduced image block 150 adjacent to this adjusted pixel block 152, at a ratio that conforms to the width of the edge pixel IB. As a result of adding the edge pixel IB to the pixel IA, the pixel IA of the complete reduced image block 150 becomes a pixel IC of a complete reduced image block 150A. The edge pixel IB is deleted. The reduced-image portion of five pixels horizontally and four pixels vertically formed from the complete reduced image block 150 and adjusted pixel block 152 becomes the complete reduced image block 150A of four pixels horizontally and four pixels vertically. Thus, the number of pixels in the horizontal direction is reduced. Similarly, with regard to the edge pixels of adjusted pixel block 152 other than the edge pixel IB, these are added to the pixels on the right edge of the complete reduced image block 150 and are deleted.

Figure 11:
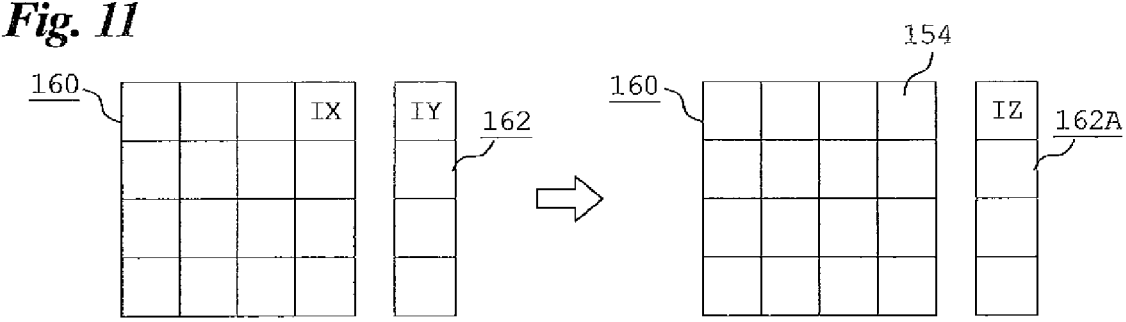
FIG. 11 illustrates processing for adjusting pixel level according to the second embodiment.

FIG. 11 illustrates processing in a case where the true width of an edge pixel forming an adjusted pixel block extracted from a padded reduced image block is equal to or greater than 0.5 pixel.

In a case where the true width of an edge pixel IY forming an adjusted pixel block 162 is equal to or greater than 0.5 pixel, a pixel IX on the right edge of a complete reduced image block 160 adjacent to the adjusted pixel block 162 is added to the edge pixel IY at a ratio conforming to the width of the edge pixel IY. As a result of adding the edge pixel IX to the pixel IY, the edge pixel IY of the image block 162 become a pixel IZ of a new image block 162A. The numbers of pixels of the reduced-image portion of five pixels horizontally and four pixels vertically formed from the complete reduced image block 160 and pixel block 162 does not change, and hence the size of five pixels horizontally and four pixels vertically formed from the complete reduced image block 160 and pixel block 162 is maintained.

Figure 12:
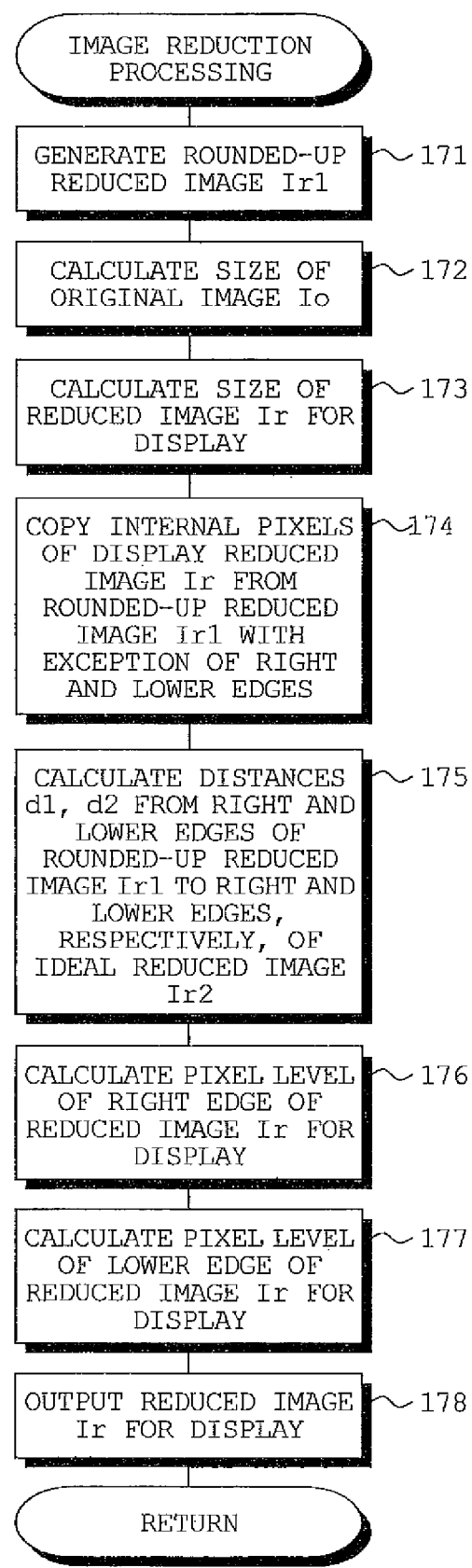
FIG. 12 is a flowchart illustrating image reduction processing according to the second embodiment.
Figure 13:
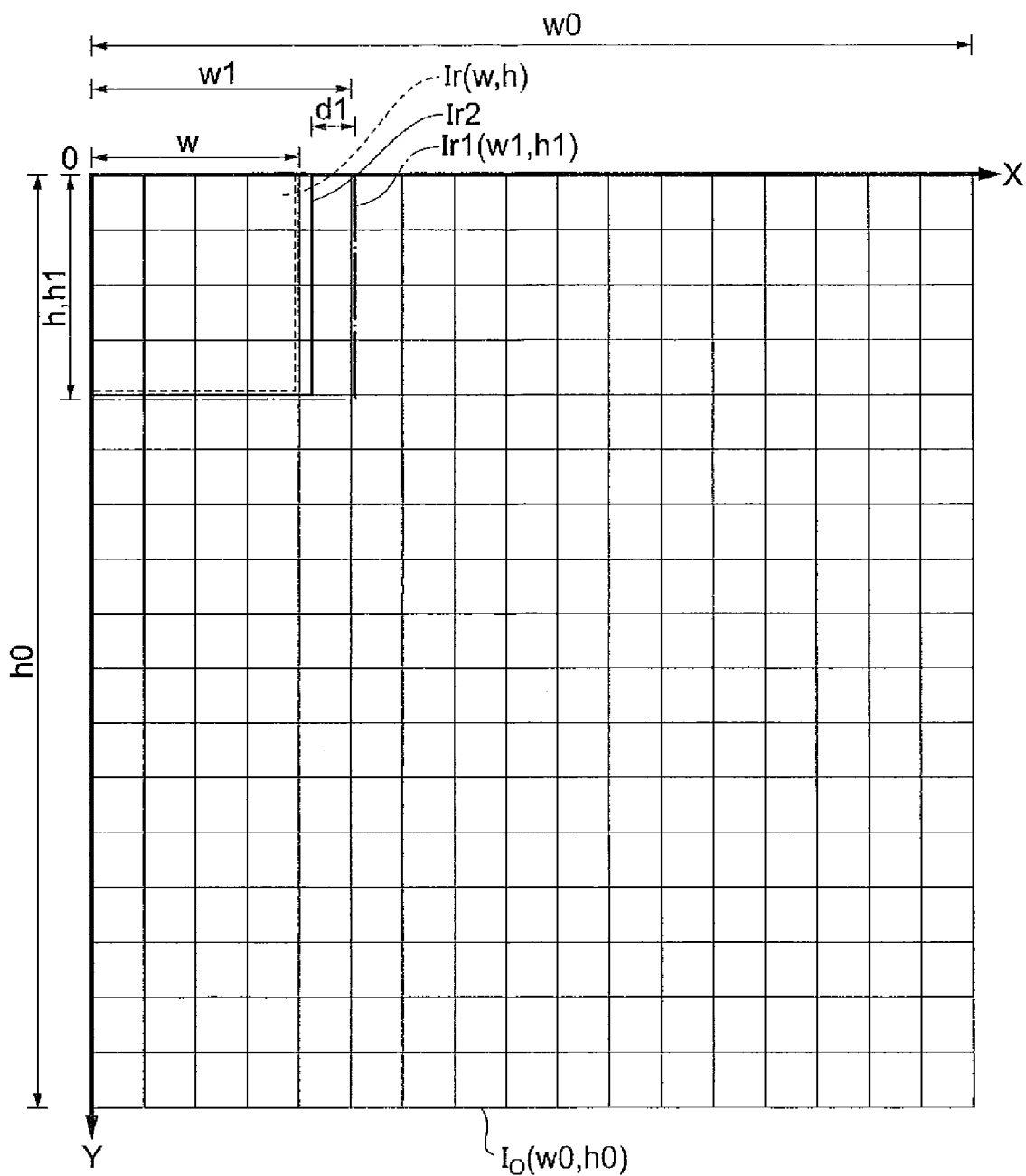
FIG. 13 illustrates the manner in which a reduced image is generated according to the second embodiment.
Figure 14:
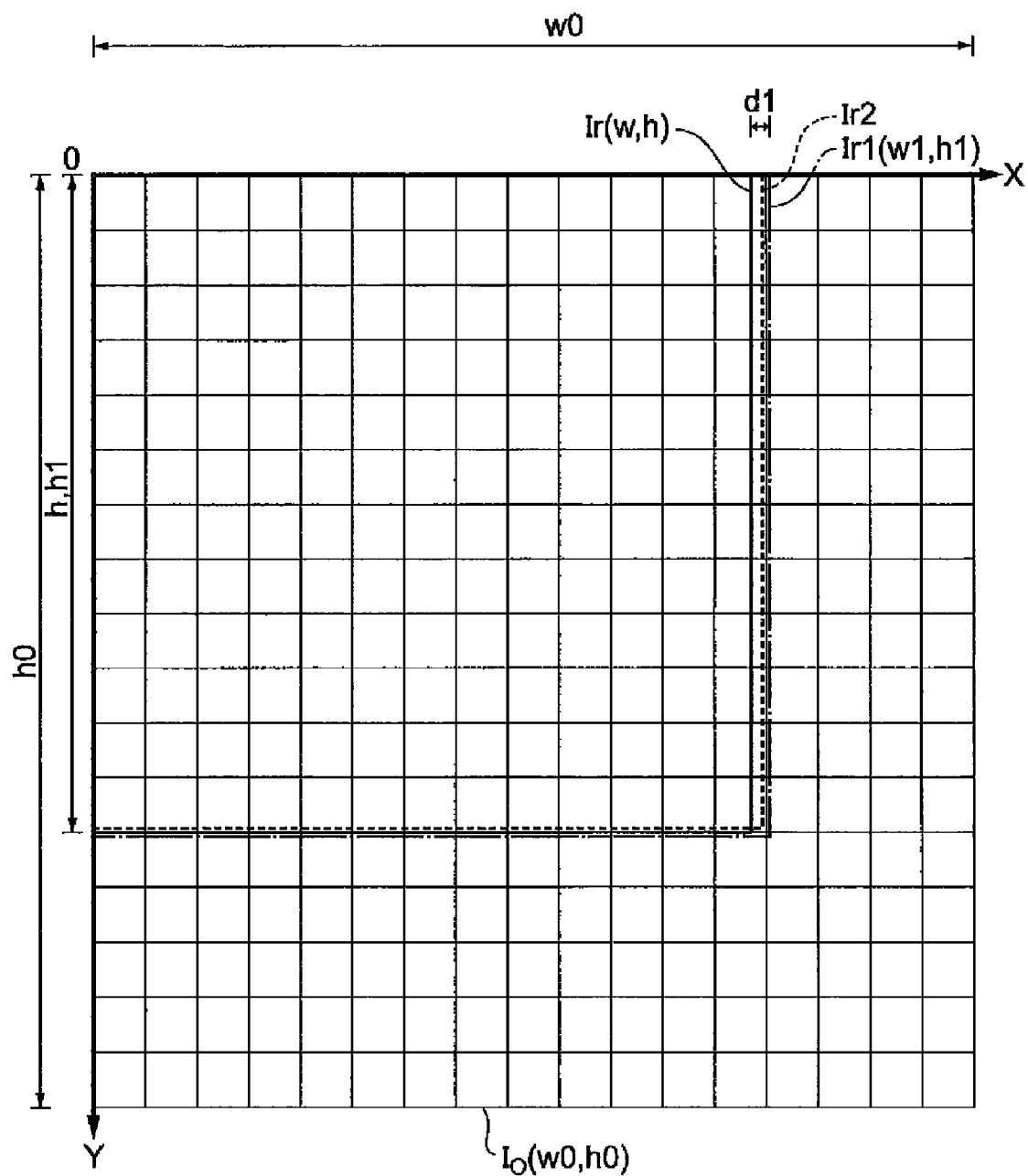
FIG. 14 illustrates the manner in which a reduced image is generated according to the second embodiment.

FIG. 12 is a flowchart illustrating image reduction processing (the processing executed at step 112 in FIG. 6), and FIGS. 13 and 14 illustrate the manner in which an original image is reduced. An original image Io (w0,h0) has 17 pixels horizontally and 16 pixels vertically in both FIGS. 13 and 14. FIG. 13 illustrates the manner in which a reduced image that will be one-fourth the size of the original in both the horizontal and vertical directions is generated, and FIG. 14 illustrates the manner in which a reduced image that will be three-fourths the size of the original in both the horizontal and vertical directions is generated. In a case where the number of pixels of a computationally ideal reduced image (described later) is an integral number and not a fractional number, the addition processing described above is halted.

The JPEG-compressed original image Io has been orthogonally transformed. To facilitate comprehension, however, the process whereby reduction processing is executed by deciding orthogonal transform coefficients, which are used in generating the reduced image, upon subjecting orthogonal transform coefficients to inverse orthogonal transformation will not be described here. However, it goes without saying that inverse orthogonal transformation, etc., is executed in the manner described above. Described first will be the case where a reduced image that is one-fourth the size of the original is generated.

In a case where a reduced image is generated from the original image Io, a rounded-up reduced image Ir1 having pixels w1 (five pixels) horizontally and pixels h1 (four pixels) vertically is generated (step 171). The rounded-up reduced image Ir1 has been rounded up in such a manner that the number of pixels will be an integral number when the number of pixels of a computationally ideal reduced image is a fractional number. Further, the size of the original image Io in terms of pixels w0 (17 pixels) horizontally and pixels h0 (16 pixels) vertically is calculated (step 172).

Next, pixels w (four pixels) in the horizontal direction and pixels h (four pixels) in the vertical direction of a reduced image Ir for output are calculated (step 173). The reduced image Ir for output is obtained by rounding off the decimal place to the nearest whole number in a case where the number of pixels in the horizontal direction and number of pixels in the vertical direction of an ideal reduced image Ir2, which is obtained by reducing the original image Io, are fractional.

Furthermore, the internal pixels forming the rounded-up reduced image Ir1 are copied with the exception of the pixels at the right and lower edges and these copied pixels are made the pixels of the reduced image Ir for output (step 174).

Next, distances d1 and d2 from the right edge and lower edge of the rounded-up reduced image Ir1 to the right edge and lower edge of the ideal reduced image Ir2, respectively, are calculated from Equations (1) and (2) below, respectively (step 175).

$$d1 = w1 - w0 \times n/8 \quad \text{Equation (1)}$$

$$d2 = h1 - h0 \times n/8 \quad \text{Equation (2)}$$

where n is an integer from 1 to 7, n/8 indicates the reduction ratio and n is 2 in the example shown in FIG. 13.

In FIG. 13, the lower edge of the rounded-up reduced image Ir1 and the lower edge of the ideal reduced image Ir2 are the same and therefore the distance from the lower edge of the rounded-up reduced image Ir1 to the lower edge of the ideal reduced image Ir2 is zero. The distance d1 is $3/4$.

Next, the pixel level of the pixel w on the right edge of the image Ir for output is calculated according to Equation (3) below (step 176).

$$Ir(w,y) = d1 \times Ir1(w1-1,y) + (1-d1) \times Ir1(w1,y) \quad \text{Equation (3)}$$

where y indicates that the y coordinate value of w1, w1−1 and w is the same.

Similarly, the pixel level of the pixel h on the lower edge of the image Ir for output is calculated according to Equation (4) below (step 177).

$$Ir(x,h) = D2 \times Ir1(x,h1-1) + (1-d1) \times Ir1(x,h1) \quad \text{Equation (4)}$$

where x indicates that the x coordinate value of h1, h1−1 and h is the same.

The reduced image Ir for output thus generated is output (displayed) (step 178). If the image is the ideal reduced image Ir2, a pixel of width 0.25 should exist on the right edge. However, a pixel having a width of 0.25 pixel is discarded by being rounded down. Although the image Ir for output has one pixel less in the horizontal direction than the rounded reduced image Ir1, the edge pixel of the reduced image Ir for output has been level-adjusted and therefore no unnatural image is produced.

With reference to FIG. 14, in a case where a reduced image that is three-fourths the size of the original image Io is generated, the ideal reduced image Ir2 will have 17 pixels× $3/4$=12.75 pixels horizontally and 16 pixels× $3/4$=12 pixels vertically. The rounded-up reduced image Ir1 and reduced image Ir for output both have 13 pixels horizontally and 12 pixels vertically. With regard to a pixel on the right edge of the image Ir for output, the true width of this pixel should be 0.75 pixel but here the width is 1 pixel. However, since the pixel has been level-adjusted, as mentioned above, any unnatural appearance is diminished. It should be noted that although the sizes of the rounded-up reduced image Ir1 and image Ir for output are the same, these images are illustrated as being slightly offset from each other to facilitate comprehension.

In the embodiment described above, only the right edge of the reduced image is discussed. It goes without saying that similar processing is executed with regard to the lower edge as well. Further, in the original image Io, etc., the rightward direction is defined as the positive direction along the X coordinate axis, the downward direction is defined as the positive direction along the Y coordinate axis and the origin of the XY coordinate system is made to conform to the upper-left corner of the original image Io, etc. The above-described processing, therefore, is executed with regard to the right edge and lower edge. However, it goes without saying that by changing the directions of the XY coordinate system, the above-described processing can be executed with regard to the right edge and upper edge of a reduced image in accordance with the directions along the XY coordinate axes.

As many apparently widely different embodiments of the present invention can be made without departing from the spirit and scope thereof, it is to be understood that the invention is not limited to the specific embodiments thereof except as defined in the appended claims.

What is claimed is:

1. An image reducing apparatus comprising:

an orthogonal transform coefficient deciding device for deciding orthogonal transform coefficients, which are used to generate a reduced image, in accordance with a reduction ratio from among orthogonal transform coefficients that constitute a complete orthogonally transformed block, wherein the complete orthogonally transformed block is obtained by orthogonally transforming a complete image block having a predetermined plurality of pixels, from among a plurality of orthogonally transformed blocks each composed of a plurality of orthogonal transform coefficients that are the result of orthogonally transforming each image block of a plurality of image blocks that form one frame of an original image, each image block being composed of a plurality of pixels;

a first reduced image block generating device for executing inverse orthogonal transformation processing using the orthogonal transform coefficients decided by said orthogonal transform coefficient deciding device, thereby generating a first reduced image block;

a padded image block restoring device for applying inverse orthogonal transformation processing to a padded orthogonally transformed block obtained by orthogonally transforming a padded image block that is the result of adding padding data to a deficient image block, which does not possess the predetermined plurality of pixels, among the plurality of orthogonally transformed blocks in such a manner that the deficient image block will have the predetermined plurality of pixels, thereby restoring the padded image block;

a modified image block generating device for generating a modified image block obtained by replacing the padding data, which is included in the padded image block restored by said padded image block restoring device, with data that is the result of copying original image data included in the padded image block;

a second reduced image block generating device for generating a second reduced image block by reducing the modified image block, which has been generated by said modified image block generating device, in accordance with the reduction ratio; and a reduced image generating device for generating a reduced image, which conforms to the reduction ratio, from the first reduced image block generated by said first reduced image block generating device and the second reduced image block generated by said second reduced image block generating device.

2. A reduced image generating method comprising the steps of:

an orthogonal transform coefficient deciding device deciding orthogonal transform coefficients, which are used to generate a reduced image, in accordance with a reduction ratio from among orthogonal transform coefficients that constitute a complete orthogonally transformed block, wherein the complete orthogonally transformed block is obtained by orthogonally transforming a complete image block having a predetermined plurality of pixels, from among a plurality of orthogonally transformed blocks each composed of a plurality of orthogonal transform coefficients that are the result of orthogonally transforming each image block of a plurality of image blocks that form one frame of an original image, each image block being composed of a plurality of pixels;

a first reduced image block generating device executing inverse orthogonal transformation processing using the orthogonal transform coefficients decided by the orthogonal transform coefficient deciding device, thereby generating a first reduced image block;

a padded image block restoring device applying inverse orthogonal transformation processing to a padded orthogonally transformed block obtained by orthogonally transforming a padded image block that is the result of adding padding data to a deficient image block, which does not possess the predetermined plurality of pixels, among the plurality of orthogonally transformed blocks in such a manner that the deficient image block will have the predetermined plurality of pixels, thereby restoring the padded image block;

a modified image block generating device generating a modified image block obtained by replacing the padding data, which is included in the padded image block restored by the padded image block restoring device, with data that is the result of copying original image data included in the padded image block;

a second reduced image block generating device generating a second reduced image block by reducing the modified image block, which has been generated by the modified image block generating device, in accordance with the reduction ratio; and a reduced image generating device generating a reduced image, which conforms to the reduction ratio, from the first reduced image block generated by the first reduced image block generating device and the second reduced image block generated by the second reduced image block generating device.

3. A non-transitory computer-readable storage medium on which is stored a computer program for controlling an image reducing apparatus so as to cause said apparatus to:

decide orthogonal transform coefficients, which are used to generate a reduced image, in accordance with a reduction ratio from among orthogonal transform coefficients that constitute a complete orthogonally transformed block, wherein the complete orthogonally transformed block is obtained by orthogonally transforming a complete image block having a predetermined plurality of pixels, from among a plurality of orthogonally transformed blocks each composed of a plurality of orthogonal transform coefficients that are the result of orthogonally transforming each image block of a plurality of image blocks that form one frame of an original image, each image block being composed of a plurality of pixels;

execute inverse orthogonal transformation processing using the orthogonal transform coefficients decided by the orthogonal transform coefficient deciding device, thereby generating a first reduced image block;

apply inverse orthogonal transformation processing to a padded orthogonally transformed block obtained by orthogonally transforming a padded image block that is the result of adding padding data to a deficient image block, which does not possess the predetermined plurality of pixels, among the plurality of orthogonally transformed blocks in such a manner that the deficient image block will have the predetermined plurality of pixels, thereby restoring the padded image block;

generate a modified image block obtained by replacing the padding data, which is included in the padded image block restored, with data that is the result of copying original image data included in the padded image block;

generate a second reduced image block by reducing the generated modified image block in accordance with the reduction ratio; and generate a reduced image, which conforms to the reduction ratio, from the generated first reduced image block and the generated second reduced image block.

4. An image reducing apparatus comprising:

an orthogonal transform coefficient deciding device for deciding orthogonal transform coefficients used when an image is reduced to n/(a prescribed number of pixels) (where n is a natural number less than the prescribed number of pixels) in horizontal and vertical directions, with regard to each orthogonally transformed block of a plurality of orthogonally transformed blocks composed of a plurality of orthogonal transform coefficients that are the result of orthogonally transforming each image block of a plurality of image blocks that form one frame of an original image, each image block being a rectangular image block comprising the prescribed number of pixels in both the horizontal and vertical directions;

a reduced image block generating device for applying inverse orthogonal transformation processing to a plurality of orthogonally transformed blocks using the orthogonal transform coefficients decided by said orthogonal transform coefficient deciding device, thereby generating a plurality of reduced image blocks;

a padded reduced image block modifying device for operating upon a padded reduced image block obtained, from among a plurality of reduced image blocks generated by said reduced image block generating device, based upon a padded image block that is the result of adding padding data to an image block among the plurality of image blocks in such a manner that the padded image block will have the prescribed number of pixels in both the horizontal and vertical directions, wherein in a case where an edge pixel corresponding to an edge of a reduced image among the pixels included in the padded reduced image block should be a fractional pixel, said padded reduced image block modifying device executes addition processing for deleting this edge pixel by adding the level of the edge pixel to the level of a pixel of the reduced image adjacent to this edge pixel when the fractional value is less 0.5, and adding the level of the pixel of the reduced image adjacent to the fractional pixel to the level of this edge pixel when the fractional value is 0.5 or greater, and in a case where the edge pixel corresponding to the edge of the reduced image is originally an integral pixel, said padded reduced image block modifying device halts the addition processing; and a reduced image generating device for generating a reduced image using a complete reduced image block from among the plurality of reduced image blocks generated by said reduced image block generating device from which padded reduced image blocks have been excluded, a padded reduced image block to which the addition processing has been applied by said padded reduced image block modifying device, and a padded reduced image block to which application of the addition processing by said padded reduced image block modifying device has been halted.

5. A reduced image generating method comprising the steps of:

an orthogonal transform coefficient deciding device deciding orthogonal transform coefficients used when an image is reduced to n/(a prescribed number of pixels) (where n is a natural number less than the prescribed number of pixels) in both and horizontal and vertical directions, with regard to each orthogonally transformed block of a plurality of orthogonally transformed blocks composed of a plurality of orthogonal transform coefficients that are the result of orthogonally transforming each image block of a plurality of image blocks that form one frame of an original image, each image block being a rectangular image block comprising the prescribed number of pixels in both the horizontal and vertical directions;

a reduced image block generating device applying inverse orthogonal transformation processing to a plurality of orthogonally transformed blocks using the orthogonal transform coefficients decided by the orthogonal transform coefficient deciding device, thereby generating a plurality of reduced image blocks;

a padded reduced image block modifying device operating upon a padded reduced image block obtained, from among a plurality of reduced image blocks generated by said reduced image block generating device, based upon a padded image block that is the result of adding padding data to an image block among the plurality of image blocks in such a manner that the padded image block will have the prescribed number of pixels in both the horizontal and vertical directions, wherein in a case where an edge pixel corresponding to an edge of a reduced image among the pixels included in the padded reduced image block should be a fractional pixel, the padded reduced image block modifying device executes addition processing for deleting this edge pixel by adding the level of the edge pixel to the level of a pixel of the reduced image adjacent to this edge pixel when the fractional value is less 0.5, and adding the level of the pixel of the reduced image adjacent to the fractional pixel to the level of this edge pixel when the fractional value is 0.5 or greater, and in a case where the edge pixel corresponding to the edge of the reduced image is originally an integral pixel, the padded reduced image block modifying device halts the addition processing; and a reduced image generating device generating a reduced image using a complete reduced image block from among the plurality of reduced image blocks generated by the reduced image block generating device from which padded reduced image blocks have been excluded, a padded reduced image block to which the addition processing has been applied by the padded reduced image block modifying device, and a padded reduced image block to which application of the addition processing by the padded reduced image block modifying device has been halted.

6. A non-transitory computer-readable storage medium on which is stored a computer program for controlling an image reducing apparatus so as to cause said apparatus to:

decide orthogonal transform coefficients used when an image is reduced to n/(a prescribed number of pixels) (where n is a natural number less than the prescribed number of pixels) in both and horizontal and vertical directions, with regard to each orthogonally transformed block of a plurality of orthogonally transformed blocks composed of a plurality of orthogonal transform coefficients that are the result of orthogonally transforming each image block of a plurality of image blocks that form one frame of an original image, each image block being a rectangular image block comprising the prescribed number of pixels in both the horizontal and vertical directions;

apply inverse orthogonal transformation processing to a plurality of orthogonally transformed blocks using the orthogonal transform coefficients decided, thereby generating a plurality of reduced image blocks;

operate upon a padded reduced image block obtained, from among a plurality of reduced image blocks generated by said reduced image block generating device, based upon a padded image block that is the result of adding padding data to an image block among the plurality of image blocks in such a manner that the padded image block will have the prescribed number of pixels in both the horizontal and vertical directions, wherein in a case where an edge pixel corresponding to an edge of a reduced image among the pixels included in the padded reduced image block should be a fractional pixel, said apparatus is caused to execute addition processing for deleting this edge pixel by adding the level of the edge pixel to the level of a pixel of the reduced image adjacent to this edge pixel when the fractional value is less 0.5, and adding the level of the pixel of the reduced image adjacent to the fractional pixel to the level of this edge pixel when the fractional value is 0.5 or greater, and in a case where the edge pixel corresponding to the edge of the reduced image is originally an integral pixel, said apparatus is caused to halt the addition processing; and generate a reduced image using a complete reduced image block from among the generated plurality of reduced image blocks from which padded reduced image blocks have been excluded, a padded reduced image block to which the addition processing has been applied, and a padded reduced image block to which application of the addition processing has been halted.

* * * * *